United States Patent
Matsuno et al.

(10) Patent No.: US 6,963,387 B2
(45) Date of Patent: Nov. 8, 2005

(54) LIQUID-CRYSTAL POLYMER FILM AND MANUFACTURING METHOD THEREOF

(75) Inventors: Soichi Matsuno, Okayama (JP);
Michihisa Kobashi, Okayama (JP)

(73) Assignee: Gore Enterprise Holdings, Inc., Newark, DE (US)

(*) Notice: Subject to any disclaimer, the term of this patent is extended or adjusted under 35 U.S.C. 154(b) by 0 days.

(21) Appl. No.: 10/439,597

(22) Filed: May 16, 2003

(65) Prior Publication Data

US 2004/0012754 A1 Jan. 22, 2004

(30) Foreign Application Priority Data

May 30, 2002 (JP) ........................................ 2002-158150

(51) Int. Cl.[7] .............................................. G02F 1/13
(52) U.S. Cl. ....................................................... 349/193
(58) Field of Search ........................................ 349/193

(56) References Cited

U.S. PATENT DOCUMENTS 6,274,242 B1 * 8/2001 Onodera et al. ......... 428/411.1

2002/0142133 A1 * 10/2002 Matsunaga et al. ......... 428/141

FOREIGN PATENT DOCUMENTS

| JP | 4-49026 A | 2/1992 |
|---|---|---|
| JP | 1995251438 A | 10/1995 |
| JP | 1995323506 A | 12/1995 |
| JP | 1997131789 A | 5/1997 |
| JP | 1998034742 A | 2/1998 |

* cited by examiner

Primary Examiner—James A. Dudek
(74) Attorney, Agent, or Firm—Kevin J. Boland

(57) ABSTRACT

A liquid-crystal polymer film with a melting point of 335° C. or greater and high surface accuracy, and specifically with a surface roughness Ra of 0.1 μm or less both in the machine direction and in the transverse direction, and a manufacturing method thereof.

A method for manufacturing a liquid-crystal polymer film with a melting point of 335° C. or greater and a surface roughness Ra of 0.1 μm or less both in the machine direction and in the transverse direction, characterized in that a laminate of a fluororesin porous film and a resin film made from a liquid-crystal polymer or a polymer alloy containing a liquid-crystal polymer is drawn, and the fluororesin porous film is peeled off.

12 Claims, 1 Drawing Sheet

LIQUID-CRYSTAL POLYMER FILM AND MANUFACTURING METHOD THEREOF

FIELD OF THE INVENTION

The present invention relates to a liquid-crystal polymer film and a manufacturing method thereof.

BACKGROUND OF THE INVENTION

In the recent use of electronic material, demands are continually increasing for heat resistance and surface accuracy in insulating films. When an insulating film is used as a substrate material, and particularly when a metal is sputtered, it becomes possible to form a thinner pattern as surface accuracy increases for the film functioning as a base.

According to JP (Kokai) 4-49026, a liquid-crystal polymer (LCP) film with high surface accuracy can be obtained by the coextrusion of an LCP and a non-LCP. A liquid-crystal polymer film with high surface accuracy can be obtained by using as a lamination film a polyether sulfone (PES) film according to JP (Kokai) 7-323506, and a thermoplastic polyimide (TPI) film according to JP (Kokai) 7-251438.

However, all these reports concern liquid-crystal polymers with boiling points of 285° C.

JP (Kokai) 9-131789 depicts an embodiment in which a liquid-crystal polymer with a melting point of 330° C. is drawn using a PES film as a lamination film, and then the lamination film is peeled off to yield a liquid-crystal polymer.

In an LCP with a melting point of 335° C. or greater, the temperature at which drawing is actually possible is at or greater than the melting point, and drawing at this temperature is impossible with PES, TPI, and the like because of their insufficient strength as lamination films.

Furthermore, JP (Kokai) 9-131789 and 10-34742 have embodiments of manufacturing an LCP film with a melting point of 335° C. or greater, but the surface roughness Rz value of the film is at best 0.5 µm, and its surface accuracy is insufficient.

Thus, none of the reports so far have cited a manufacturing example of a liquid-crystal polymer film with a melting point of 335° C. or greater and a surface roughness Ra of 0.1 µm or less both in the machine direction and in the transverse direction.

An object of the present invention is to provide a liquid-crystal polymer film (and a manufacturing method thereof) with a melting point of 335° C. or greater and high surface accuracy, and specifically with a surface roughness Ra of 0.1 µm or less both in the machine direction and in the transverse direction.

The inventors completed the present invention as a result of intense research aimed at resolving the above-mentioned problems.

Specifically, the present invention provides a liquid-crystal polymer film with a melting point of 335° C. or greater and a surface roughness Ra of 0.1 µm or less both in the machine direction and in the transverse direction, which is obtained by a process in which a laminate of a fluororesin porous film and a resin film made from a liquid-crystal polymer or a polymer alloy containing a liquid-crystal polymer is drawn, and the fluororesin porous film is peeled off.

The present invention also provides a method for manufacturing a liquid-crystal polymer film with a melting point of 335° C. or greater and a surface roughness Ra of 0.1 µm or less both in the machine direction and in the transverse direction, characterized in that a laminate of a fluororesin porous film and a resin film made from a liquid-crystal polymer or a polymer alloy containing a liquid-crystal polymer is drawn, and the fluororesin porous film is peeled off.

The liquid-crystal polymer used in the present invention is preferably a thermotropic liquid-crystal polymer with a melting point of 335° C. or greater, and various types known in conventional practice can be used. A preferable melting point is 335–400° C. Such liquid-crystal polymers include, for example, aromatic polyesters that display liquid crystallinity when melted and are synthesized from monomers such as aromatic diols, aromatic carboxylic acids, and hydroxycarboxylic acids. Typical examples thereof include type 1 polymers comprising p-hydroxybenzoic acid (PHB), terephthalic acid, and biphenyls (formula 1 below); type 2 polymers comprising PHB and 2,6-hydroxynaphthoic acid (formula 2 below); and type 3 polymers comprising PHB, terephthalic acid, and ethylene glycol (formula 3 below).

Chemical Formula 1

(1)

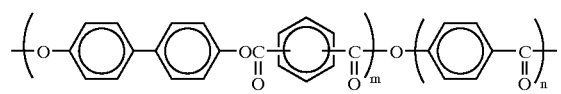

Chemical Formula 2

(2)

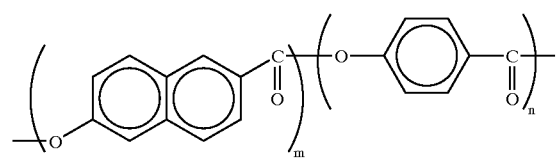

Chemical Formula 3

(3)

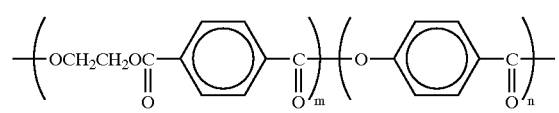

In the present invention, it is acceptable to use a polymer alloy containing a liquid-crystal polymer as a polymer alloy component instead of using a liquid-crystal polymer alone. In this case, polymers that can be mixed or chemically bonded with the liquid-crystal polymer include, but are not limited to, polyether ether ketone, polyether sulfone, polyimide, polyetherimide, polyamide, polyamide-imide, polyarylate, and the like. The mixture ratio of the macromolecules and liquid-crystal polymer is preferably (by weight) 10:90–90:10, and more preferably 30:70–70:30. The polymer alloy containing a liquid-crystal polymer also has excellent properties due to the liquid-crystal polymer.

In the present invention, the resin composed of a liquid-crystal polymer or a polymer alloy with a liquid-crystal polymer as the alloy component may also contain additives such as compatibility accelerators, plasticizers, or flame retardants, or fillers such as inorganic powder or fiber, which are added in accordance with the intended purpose.

In the present invention, the liquid-crystal polymer or the polymer alloy containing a liquid-crystal polymer (these will also be referred to hereinbelow simply as "liquid-crystal polymer") used as a raw film is formed into a film. Film forming in this case can be done by extrusion, roll calendering, or the like. This raw liquid-crystal polymer resin film has a thickness of 5–1000 μm, and preferably 10–500 μm.

The fluororesin porous film used as a lamination film in the present invention preferably has a specific gravity of 1.3 or greater, and more preferably 1.5 or greater, the upper limit of which is commonly about 2.0. The porosity thereof is preferably 40% or less, and more preferably 30% or less, the lower limit of which is commonly about 5%. The elongation at break in the direction of draw is preferably 400% or greater, and more preferably 600% or greater. The upper limit thereof is commonly about 900%.

The fluororesin porous film preferably has an average pore size of 0.05–5.0 μm, and more preferably of 0.2–1.0 μm. The thickness thereof is preferably 5–300 μm, and more preferably 20–150 μm.

In addition to polytetrafluoroethylene, examples of possible fluororesins in the fluororesin porous film include tetrafluoroethylene/hexafluoropropylene copolymers, polyvinyl fluoride, polyvinylidene fluoride, polytrifluorochloroethylene, and the like. In the present invention, an drawn porous polytetrafluoroethylene film is preferred on the basis of heat resistance and chemical resistance.

If the specific gravity of the fluororesin porous film used in the present invention is too small, the surface roughness Ra of the resulting liquid-crystal polymer film increases (the surface becomes rough). The surface roughness Ra of the resulting liquid-crystal polymer film also increases (the surface becomes rough) when elongation at break in the direction of draw is too low.

The method for manufacturing a liquid-crystal polymer of the present invention comprises steps of forming a laminate film, drawing, cooling, and peeling. Each of these steps is described below in detail.

This step entails forming a laminate film by the thermocompression bonding of a fluororesin porous film on both sides of a liquid-crystal polymer film. The preferred temperature for obtaining the laminate film differs depending on the melting point of the liquid-crystal polymer film employed, but it is essentially a temperature which softens at least the surface of the liquid-crystal polymer film, or else the area in contact with the fluororesin porous film or the entire film, while the fluororesin porous film maintains sufficient strength.

When the laminate film is manufactured in this manner, a pair of thermocompression bonding rolls or a hot-press device is used as the thermocompression bonding device. When thermocompression bonding rolls are used, the liquid-crystal polymer film and the two fluororesin porous films laminated to both surfaces thereof are fed to a gap (clearance) between the pair of thermocompression bonding rolls and are thermocompression-bonded in the gap between the thermocompression bonding rolls. The liquid-crystal polymer film used herein can be a solid sheet, a softened film extruded from the T-die of an extruder, or the like. Conversely, when a hot-press device is used, a fluororesin porous film is laid on the bottom plate of the hot-press device, a liquid-crystal polymer film is laid thereon, a fluororesin porous film is placed on top, the resulting assembly is thermocompression-bonded by applying downward pressure with a top plate for a specific period of time, and the product is cooled. In this case, the bottom plate and/or top plate is heated, and at least the surface portion of the liquid-crystal polymer film is softened. The laminate obtained by the laminate film forming step is sent on to the subsequent drawing step either directly or after being cooled.

Figure 1:
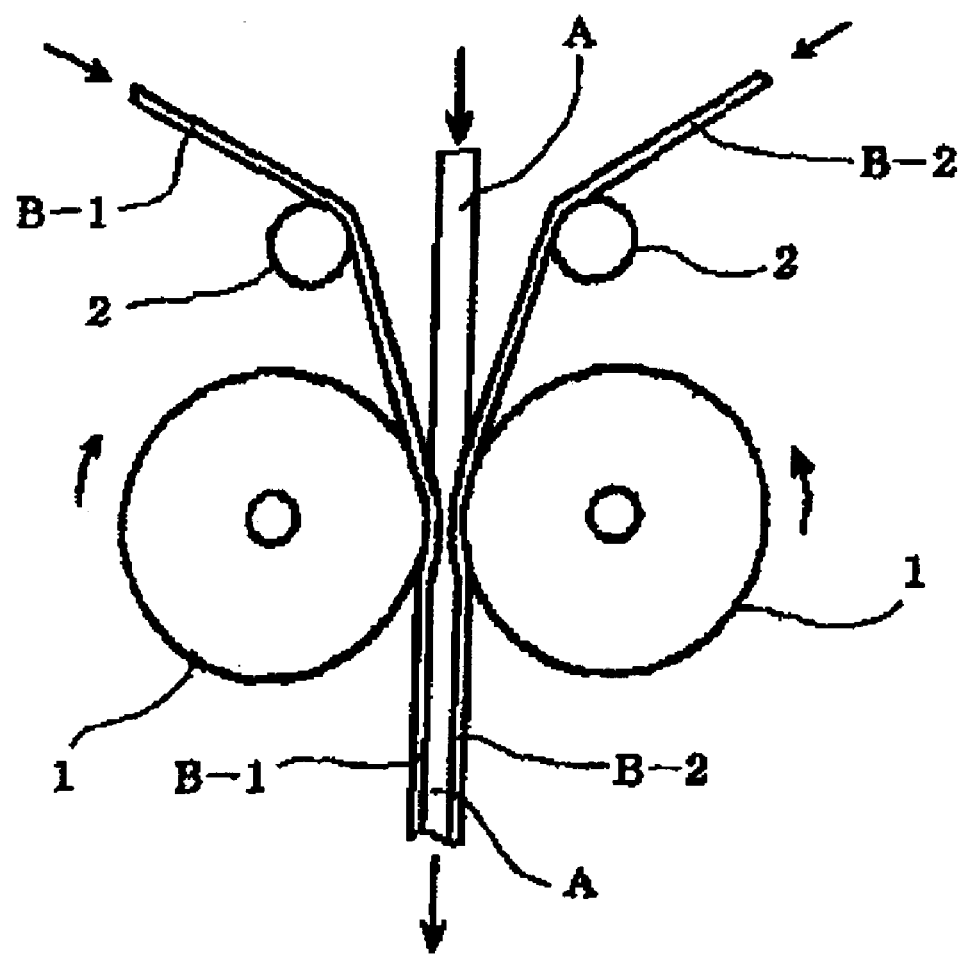
FIG. 1 is a diagram of one example of the method for manufacturing a laminate film.

| [Key to Symbols] | |
|---|---|
| 1: | thermocompression bonding rolls |
| 2: | guiding rolls |
| A: | liquid-crystal polymer film |
| B-1, B-2: | fluororesin porous films |

DETAILED DESCRIPTION

FIG. 1 is a diagram illustrating an example of the method for manufacturing the laminate film.

In FIG. 1, 1 indicates thermocompression bonding rolls. 2 indicates guiding rolls, A indicates a liquid-crystal polymer film, and B-1 and B-2 indicate fluororesin porous films.

During manufacture of a laminate film according to FIG. 1, the liquid-crystal polymer film A and the two fluororesin porous films B-1 and B-2 are fed to a gap (clearance) between the pair of thermocompression bonding rolls 1, 1 and are thermocompression-bonded in the gap between the thermocompression bonding rolls. In this case, the fluororesin porous films B-1 and B-2 are supplied to both sides of the liquid-crystal polymer film A. The liquid-crystal polymer film A can be a solid sheet, a softened film extruded from the T-die of an extruder, or the like. The laminate obtained by the laminate film forming step is sent on to the subsequent drawing step either directly or after being cooled.

During this step, the laminate film obtained by the laminate film formation step is drawn uniaxially or biaxially, that is, only in the direction perpendicular to the orientation direction of the liquid-crystal polymer film (transverse direction) or both in the same direction as the orientation of the liquid-crystal polymer film (machine direction) and in the direction perpendicular thereto (transverse direction), under temperature conditions in which the fluororesin porous film softens but the liquid-crystal polymer film melts or softens while remaining substantially unmelted. The drawing may either be sequential or continuous. In this case, the draw ratio in the machine direction is 1–10, and preferably 1–5, and the draw ratio in the transverse direction is 1.5–20, and preferably 3–15. The draw ratio in the transverse direction should be established as 1.0–5.0 times the draw ratio in the machine direction, and preferably 1.5–3.0 times. The drawing speed is 1–200% per second, and preferably 5–50% per second. The drawing device may be a conventionally known device.

This step entails cooling the laminate film obtained during the drawing step, and cooling and solidifying the molten liquid-crystal polymer film, and can be implemented using a pair of cooling rolls. The step may also be performed by natural cooling.

This step entails peeling off the fluororesin porous films thermocompression-bonded to both sides of the laminate film obtained by the cooling step. The fluororesin porous films are weakly bonded to, and can be easily peeled off from, the liquid-crystal polymer film due to adequate lamination and thermocompression bonding conditions, allowing the porous films to be easily peeled off by being pulled up from the liquid-crystal polymer film.

The liquid-crystal polymer film thus obtained is a drawn liquid-crystal polymer film with a surface roughness Ra of 0.1 μm or less, and preferably 0.07 μm or less, both in the machine direction (the same direction as the orientation of the liquid-crystal polymer film) and in the transverse direction (the direction perpendicular to the orientation direction of the liquid-crystal polymer film).

The thickness of the liquid-crystal polymer film of the present invention is 10–300 μm, and preferably 25–125 μm.

EXAMPLE 1

Next, the present invention will be described in detail through a practical example.

A liquid-crystal polymer (LCP) was melted in a short-screw extruder (screw diameter: 50 mm), the melt was extruded into a film shape from a T-die at the tip of the extruder (lip length: 300 cm, lip clearance: 2.5 mm, die temperature: 350° C.), and the film was cooled to yield a raw LCP film with a thickness of 250 μm.

Next, each side of this raw LCP film was laminated with the lamination films (thickness: 100 μm) shown in Table 1, the films were thermocompression-bonded with the aid of a pair of rolls (temperature: 330° C., roll peripheral speed: 2 m/min), and the bonded films were then cooled by being passed between a pair of cooling rolls (temperature: 150° C., roll peripheral speed: 2 m/min).

Next, the laminated film was drawn with the aid of a biaxial drawing device at a drawing temperature of 350° C., a draw ratio of 1.3 in the machine direction and 3.9 in the transverse direction, and a drawing speed of 20% per second. Finally, the lamination films were peeled off from both sides of the liquid-crystal polymer film, yielding a liquid-crystal polymer film product with a thickness of 50 μm.

The surface roughness Ra (μm) of the LCP film obtained as previously described is shown in Table 1 in relation to the lamination films employed.

The surface roughness and other such physical properties shown in Table 1 were measured as follows.

A surface roughness measuring device SV600 made by Mitutoyo Corp. was used to measure the surface roughness Ra (μm) (refer to JIS B0601) of the liquid-crystal polymer film both in the machine direction and in the transverse direction.

A liquid-crystal polymer sample of 10 mg was weighed, and a differential scanning calorimeter made by TA Instruments was used to measure an endothermic thermograph by raising the temperature at a rate of 40° C. per minute from 50° C. to 370° C. and maintaining it for 5 minutes, then lowering the temperature at a rate of 20° C. per minute to 25° C., and then once again raising the temperature at a rate of 20° C. per minute to 370° C. The melting point was calculated from the temperature at which an endothermic peak was observed during the second temperature increase.

The elongation at break shown in Table 1 refers to elongation at break in the direction of draw. This was measured according to JIS K7161.

The specific gravity was measured by cutting out a specific area of the film, measuring its thickness, and calculating its volume V. The weight W of the cut-out film was then measured.

Specific gravity G was calculated as weight W (g)/volume V (cm$^3$).

The porosity P (%) of ePTFE was calculated as [(2.2−Specific gravity G)/2.2]×100 (%) because the true specific gravity of PTFE was assumed to be 2.2.

TABLE 1

| Experiment No. | LCP | Lamination film | | | | LCP film Ra (μm) | |
|---|---|---|---|---|---|---|---|
| | | Type | Specific gravity | Porosity (%) | Elongation at break (%) | MD | TD |
| 1 | A | ePTFE | 1.90 | 13 | 850 | 0.042 | 0.039 |
| 2 | A | ePTFE | 1.50 | 32 | 680 | 0.059 | 0.051 |
| 3 | B | ePTFE | 1.50 | 32 | 680 | 0.043 | 0.041 |
| 4* | A | EPTFE | 0.50 | 77 | 100 | 0.167 | 0.121 |
| 5* | A | EPTFE | 0.76 | 65 | 140 | 0.163 | 0.08 |
| 6* | A | Skived | 2.11 | 4 | 300 | — | — |
| 7* | A | TPI | 1.45 | 0 | 50 | — | — |

*shows comparative examples
The symbols shown in Table 1 are as follows.
(1) LCP: A
Sumitomo Chemical Co., Ltd.; Sumika Super E6000 (melting point: 355° C.)
(2) LCP: B
Polyplastics Co., Ltd.; Vectra E950 (melting point: 345° C.)
(3) ePTFE
Drawn porous polytetrafluoroethylene
(4) Skived
PTFE skived film
(5) TPI
Heat reversible polyimide film As can be seen from the results shown in Table 1, the LCP film of the present invention has low surface roughness and high surface accuracy.

The lamination films in Experiments No. 6 and 7 ruptured during drawing.

The present invention provides an improvement in surface accuracy in a resin film composed of a high-melting liquid-crystal polymer or alloy with a melting point of 335° C. or greater. This film can be used to advantage in a wide range of fields.

What is claimed is:

1. A liquid-crystal polymer film with a melting point of 335° C. or greater and a surface roughness Ra of 0.1 μm or less both in the machine direction and in the transverse direction, which is obtained by a process in which a laminate of a fluororesin porous film and a resin film made from a liquid-crystal polymer or a polymer alloy containing a liquid-crystal polymer is drawn, and the fluororesin porous film is peeled off.

2. The liquid-crystal polymer film according to claim 1, wherein the fluororesin porous film has a specific gravity of 1.3 or greater and an elongation at break in the direction of draw of 400% or greater.

3. The liquid-crystal polymer film of claim 1, wherein the liquid-crystal polymer film has a surface roughness Ra of 0.07 µm or less both in the machine direction and in the transverse direction.

4. The liquid-crystal polymer film of claim 1, wherein the liquid-crystal polymer film has a thickness of from 10 to 300 µm.

5. The liquid-crystal polymer film of claim 4, wherein the liquid-crystal polymer film has a thickness of from 25 to 125 µm.

6. The liquid-crystal polymer film of claim 1, wherein the liquid-crystal polymer film has a melting point of 335 to 400° C.

7. The liquid-crystal polymer film of claim 2, wherein the fluororesin porous film has a specific gravity of 1.5 or greater.

8. The liquid-crystal polymer film of claim 2, wherein the fluororesin porous film has an elongation at break In the direction of draw of 600% or greater.

9. The liquid-crystal polymer film of claim 1, wherein the fluororesin porous film has an average pore size of 0.05 to 5.0 µm.

10. The liquid-crystal polymer film of claim 9, wherein the fluororesin porous film has a thickness of 5 to 300 µm.

11. The liquid-crystal polymer film of claim 9, wherein the fluororesin porous film has an average pore size of 02 to 1.0 µm.

12. The liquid-crystal polymer film of claim 10, wherein the fluororesin porous film has a thickness of 20 to 150 µm.

\* \* \* \* \*